(12) United States Patent
Takeuchi

(10) Patent No.: US 6,229,628 B1
(45) Date of Patent: *May 8, 2001

(54) IMAGE READING APPARATUS

(75) Inventor: Yukitoshi Takeuchi, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/876,023

(22) Filed: Jun. 13, 1997

(30) Foreign Application Priority Data

Jun. 17, 1996 (JP) .................................................. 8-177105

(51) Int. Cl.$^7$ ................................................ H04N 1/04
(52) U.S. Cl. ......................... 358/475; 358/474; 358/487
(58) Field of Search ................................ 358/474, 475, 358/509, 406, 461, 497, 487, 506

(56) References Cited

U.S. PATENT DOCUMENTS

| | | | |
|---|---|---|---|
| 5,164,845 | 11/1992 | Takeuchi | 358/474 |
| 5,239,393 | 8/1993 | Takeuchi | 358/474 |
| 5,289,000 | * 2/1994 | Toyofuku | 358/497 |
| 5,392,100 | 2/1995 | Yoshida | 355/235 |
| 5,822,052 | * 10/1998 | Tsai | 358/406 |

FOREIGN PATENT DOCUMENTS

| | | |
|---|---|---|
| 580 148 A3 | 7/1993 | (EP) . |
| 622 944 A2 | 11/1994 | (EP) . |
| 64-000859 | 1/1989 | (JP) . |
| 7-135167 | 5/1995 | (JP) . |

OTHER PUBLICATIONS

Patent Abstracts of Japan, vol. 13, No. 168 (E–747), Apr. 21, 1989 for JP 64–000859 dated Jan. 5, 1989.
Patent Abstracts of Japan, vol. 095, No. 008, Sep. 29, 1995 for JP 07–135167 A dated May 23, 1995.

* cited by examiner

Primary Examiner—Thomas D. Lee
(74) Attorney, Agent, or Firm—Fitzpatrick, Cella, Harper & Scinto

(57) ABSTRACT

An image reading apparatus is disclosed which has the function of optically reading a transparent document while causing a transparent-document illuminating light source to move along the document. The apparatus has a correcting device for correcting the relative position between the transparent-document illuminating light source and a scanning unit located when document reading is started. It is thus possible to substantially maintain a light quantity at the reading lines while a document-reading operation is performed.

9 Claims, 9 Drawing Sheets

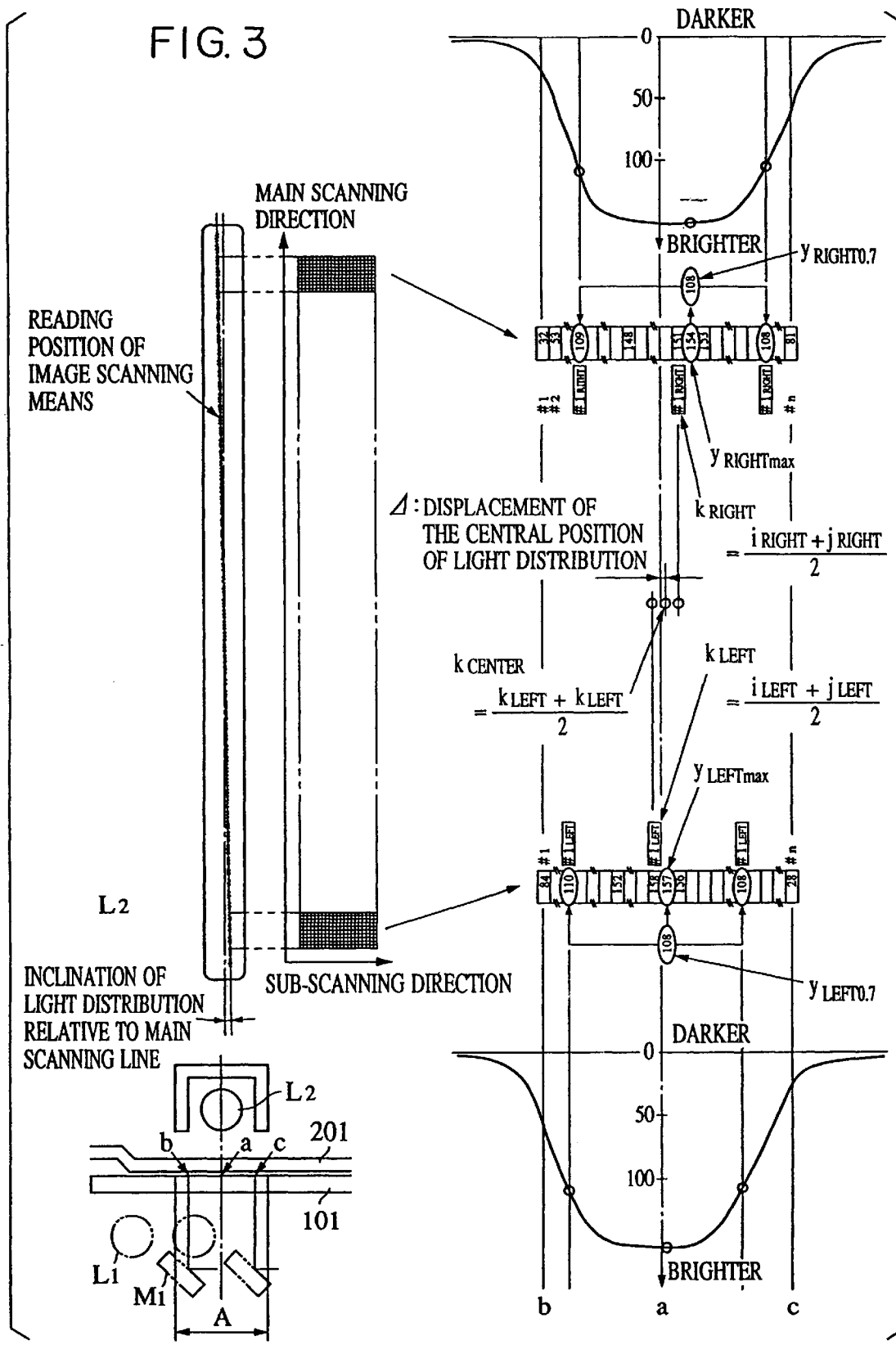

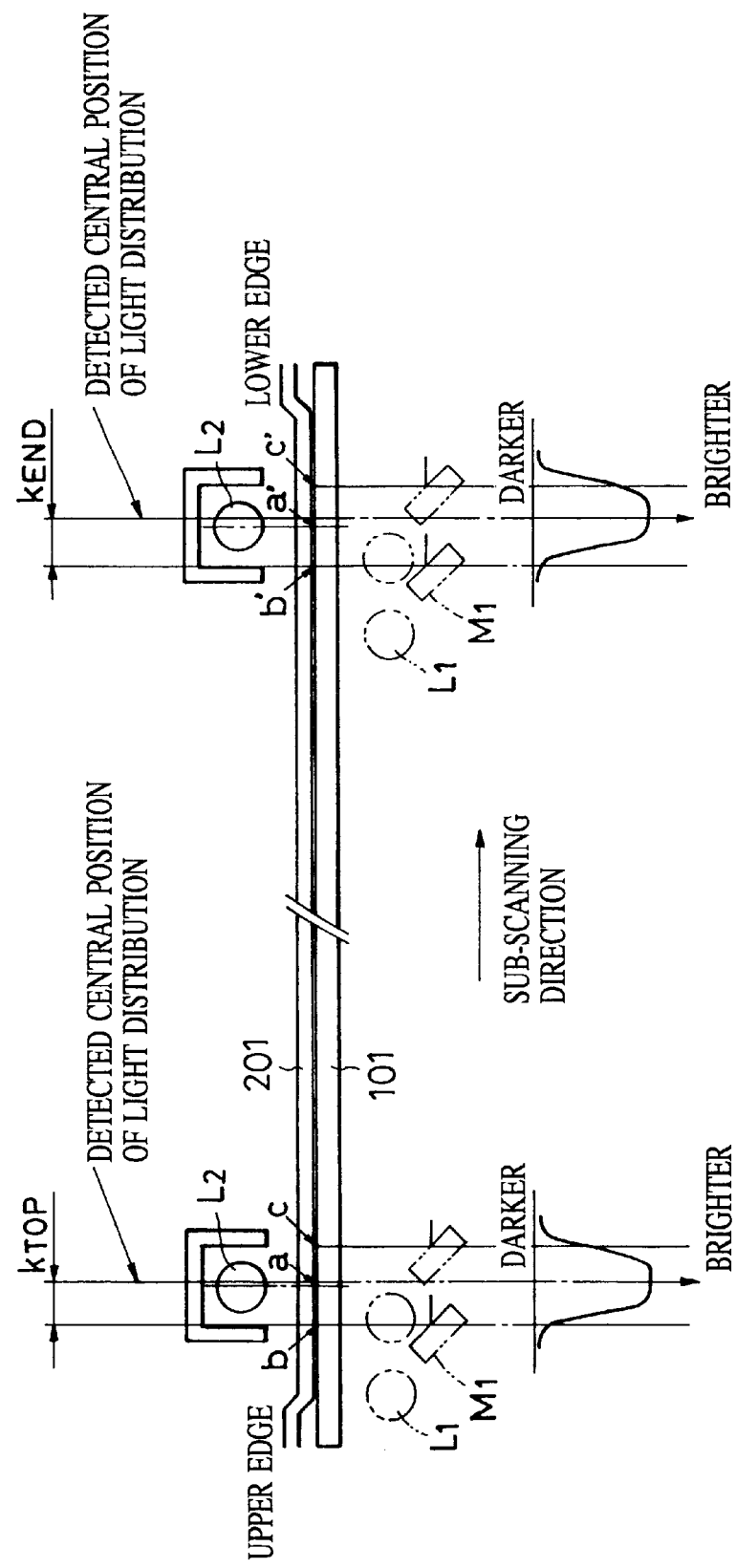

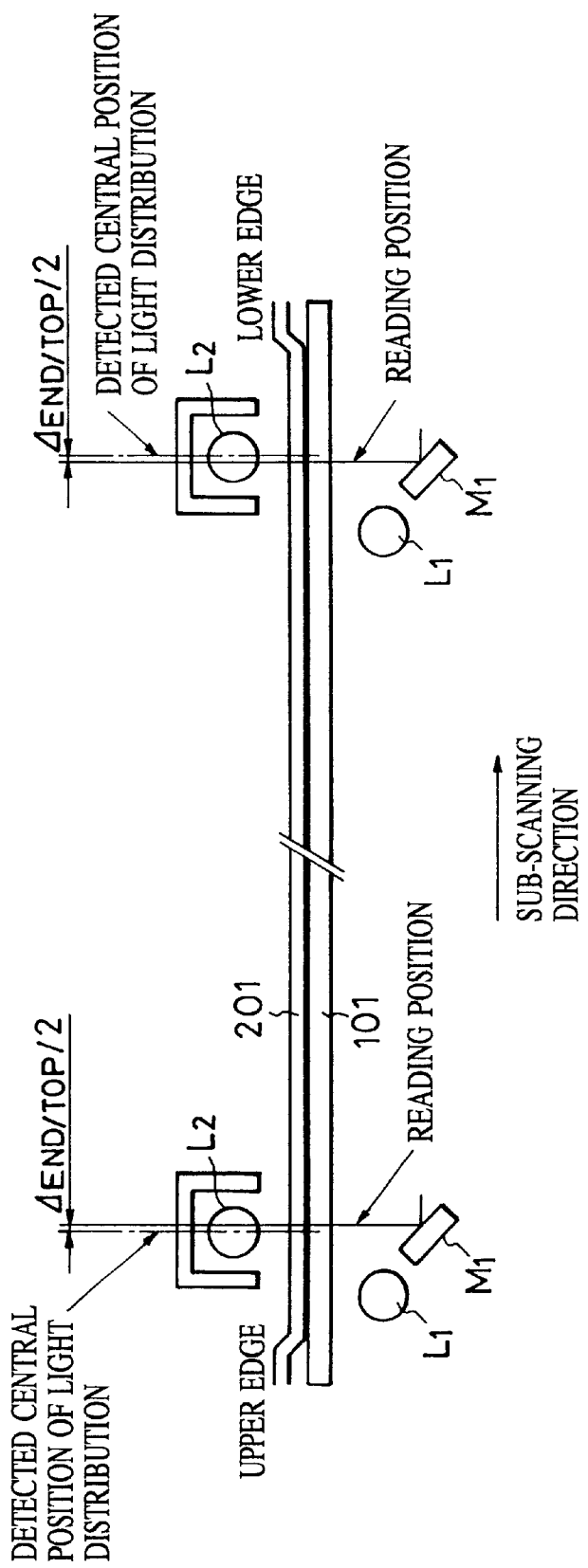

LIGHT DISTRIBUTION OF
LIGHT SOURCE $L_2$ ON
DOCUMENT-MOUNTING
GLASS 101

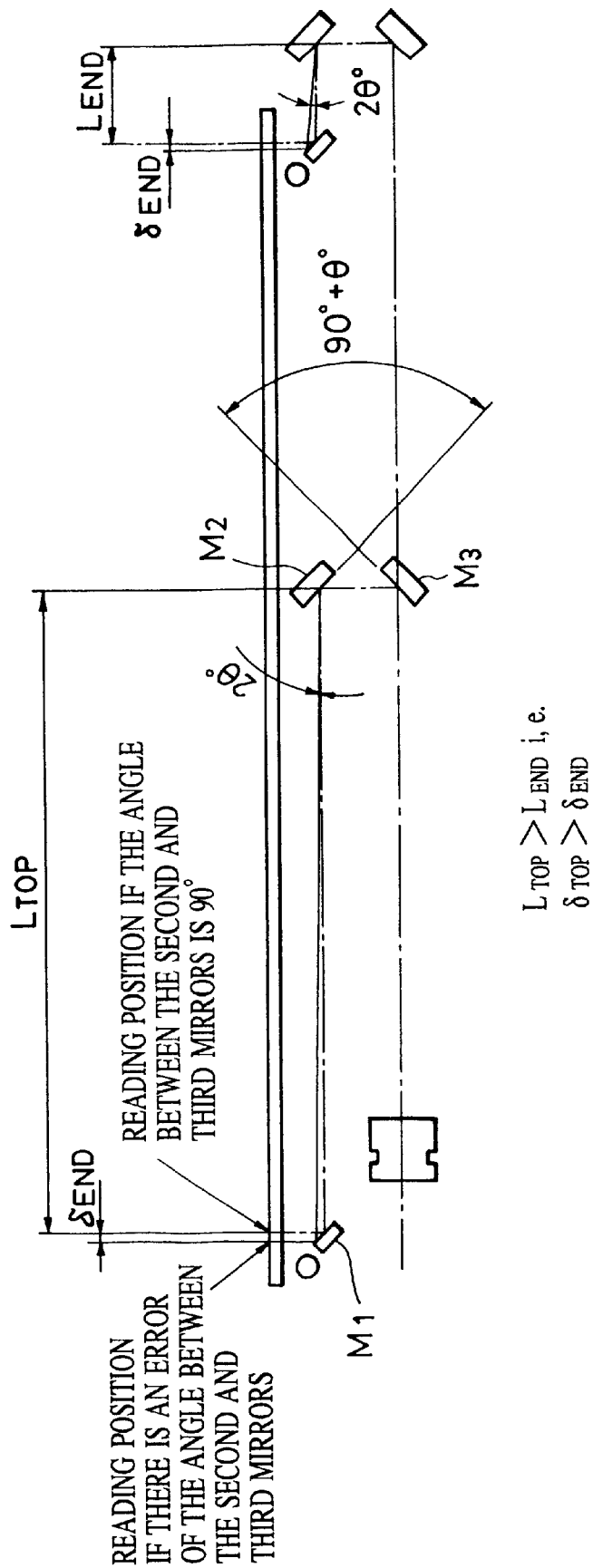

IMAGE READING APPARATUS

BACKGROUND OF THE INVENTION

1. Field of the Invention

The present invention relates generally to an image reading apparatus for applying light to an original document and reading a document image. More particularly, the invention relates to an image reading apparatus which is capable of sharply reading a transparent document.

2. Related Background Art

FIG. 6A is a schematic diagram illustrating a conventional image reading apparatus. In the drawing, there is shown an image sensor 106 serving as photoelectric conversion means, such as a charge coupled device (CCD) for converting information concerning a scanned image into an electric signal, the sensor 106 being disposed within the main unit (apparatus unit) 100 of an image reading apparatus.

An original-document-mounting glass 101, used as a transparent original-document-mounting table, is disposed on the top surface of the apparatus unit 100. A document P placed on the surface of the document-mounting glass 101 is scanned by a scanning optical system 102 serving as scanning means so as to expose image information onto the image sensor 106.

Disposed within the image sensor 106 are three rows of sensors provided with filters of three colors, such as red (R), green (G) and blue (B), respectively, thereby performing color separation when reading a document image. The image scanning means 102 is constructed of a lamp unit 103 and a mirror unit 104, both of which are moved parallel to the glass 101 to perform scanning, and a stationary lens 105 fixed in the apparatus unit 100.

The lamp unit 103 is formed of a white-color light source $L_1$ for illuminating the document P, and a first mirror $M_1$ for reflecting the reflected light from the image formed on the document P toward the mirror unit 104. The mirror unit 104 is comprised of second and third mirrors $M_2$ and $M_3$, respectively, for returning the image light reflected by the first mirror $M_1$ toward the image sensor 106.

The lamp unit 103 moves at a velocity twice as fast as the mirror unit 104 to perform scanning in order to ensure a constant optical path in the overall image reading region. Accordingly, the scanning optical system 102 of the above type is referred to as a "2:1 scanning optical system". These units 103 and 104 perform scanning (sub-scanning) using a driving source (not shown), such as a pulse motor, as a power source, in synchronization with the reading cycle of the image sensor 106.

In FIG. 6A, there is also shown a transparent-document-reading light source unit 200 serving as illumination means for reading transparent documents. Disposed within the light source unit 200 are a light source $L_2$ located parallel to the light source $L_1$ within the apparatus unit 100, and a light-diffusing translucent plate 201 placed to oppositely face the document-mounting table 101. The transparent-document-reading light source unit 200 is attached to the rear end of the image reading apparatus and pivots about a hinge 202.

For reading a transparent document, the light source $L_2$ is driven by a driving source (not shown) to scan the area covered by the document-mounting glass 101 in a direction parallel to the translucent plate 201 while synchronizing with the image scanning means 102 of the apparatus unit 100. During this scanning operation, the light source $L_1$ within the apparatus unit 100 is switched off. Light emitted from the light source $L_2$ is diffused in the translucent plate 201, bringing about a light distribution illustrated in FIG. 6B (enlarged from the region D1 shown in FIG. 6A) on the document surface. From the light distributed as indicated in FIG. 6B, the light located on the light path in an area from the reading position of the image reading apparatus unit 100 to the image sensor 106 penetrates the document placed at a position P shown in FIG. 6A and is directed to the image sensor 106.

For reading a transparent document, the document is not allowed to be placed in the area A (hereinafter referred to as "the document-placing prohibited area A") at the upper edge of the document-mounting table 101. Prior to document reading, in this area A the image sensor 106 reads the light quantity and the light distribution directly obtained from the transparent-document light source $L_2$ and uses these as data concerning, for example, shading correction.

FIG. 7 schematically illustrates a document image being formed on photodetectors of the image sensor 106. Photodetectors of three colors 106R, 106G and 106B are spaced apart from each other because a portion for accumulating charges photoelectrically converted by the photodetectors and a portion for transferring signals to an output stage are adjacently disposed around the photodetectors 106R, 106G and 106B of the image sensor 106.

Since the image sensor 106 is shifted relative to the document to allow the photodetectors 106R, 106G and 106B to read the same position of the document, the intervals between the photodetectors 106R, 106G and 106B are determined to be integral multiples of the width of the photodetectors 106R, 106G and 106B. If there is an m-line interval between the photodetectors 106R and 106G and an n-line interval between the photodetectors 106G and 106B, an image signal G representing one line of a document image is read m lines later relative to an image signal R, and an image signal B is read (m+n) lines later relative to the image signal R.

FIG. 8 is a block diagram illustrating the processing of image data read by the color image sensor 106. After the image data items of the respective colors read by the image sensor 106 are sent to and amplified in amplifiers 121R, 121G and 121B, respectively, they are converted into digital image signals by analog-to-digital (A/D) converters 122R, 122G and 122B, respectively. The A/D converters 122R, 122G and 122B each divide the dynamic range (a difference in the reading output between a pure white region and a pure black region of the document) of the image sensor 106 according to a bit number, thereby assigning levels of gradation according to the brightness of the document image.

For example, 8-bit-resolution A/D converters are capable of distinguishing a white to black gradation into 256 levels, while 10-bit-resolution A/D converters can differentiate the same gradation into 1024 levels. Thus, an image reading apparatus using A/D converters with RGB colors each having 8 bits can identify 24 bits, i.e., approximately 16.7 million colors, while an image reading apparatus using A/D converters with RGB colors each having 10 bits can distinguish 30 bits, i.e., about 1074 million colors.

The photodetectors 106R, 106G and 106B of the respective colors of the image sensor 106 are spaced apart from each other as noted above. Accordingly, in order to perform phase matching of the respective image signals before the signals are input into an image processing circuit 124, a (m+n)-line buffer memory 123R and an n-line buffer memory 123G are respectively provided at the rear stage of the A/D converters 122R and 122G, and the image signals R and G can be output simultaneously with the last-read B signal. In the image processing circuit 124, the image signals are subjected to processing, such as binary processing, for color correction. The resulting image signals are output to a machine 300, such as a personal computer, via an interface circuit 125.

There are several types of output states of the image signals from the image reading apparatus, and a suitable type can be selected according to the use of the read image. For example, when text is read by an optical character reader (OCR), or when a monochrome diagram is read, a monochrome binary image is appropriate. More specifically, a G signal, for example, among the RGB image signals is used and binarized with a threshold in the image processing circuit 124, and the binarized image data is selected. Further, when a photographic image is read and output to a monochrome printer, image data binarized using the G signal according to half tone processing, such as the dither method or the error diffusion method, is used. Multilevel (e.g. 24 bits, etc.) image data is suitably used for processing color images.

In most cases, the resolution of the A/D converters used in the image reading apparatus is comparable to the image processing performance of a computer to be connected to the apparatus (A/D converters with RGB colors each having 8 bits are employed in an image reading apparatus for use in a computer which is capable of processing 24-bit images). For achieving higher-precision gradation steps, however, some image reading apparatuses use A/D converters with a resolution higher than the image processing performance of the corresponding computer. In this type of image reading apparatus using, for example, A/D converters with RGB colors each having 10 bits, the respective RGB signals each having 10-bit gradation levels are converted into 8-bit signals in the above-described image processing circuit 124, and the 8-bit signals are output.

In the above-described 2:1 optical system, there are two factors which determine the precision of the reading magnification in the sub-scanning direction. One factor is moving precision of the lamp unit 103 and the mirror unit 104 (see FIG. 6A). The other factor is mounting precision of the optical system 102, for example, precision of the angle between the second and third mirrors $M_2$ and $M_3$; if this angle deviates from 90 degrees, a deviation of the reading position relative to the first mirror $M_1$ is generated, as shown in FIG. 9, from the upper to lower edges in the sub-scanning direction. This further displaces the positional relationship of the reading position to the transparent-document reading light source $L_2$. If there is any change in the light quantity at the reading position due to the above deviations, a document cannot be correctly illuminated, thereby failing to accurately reproduce the brightness of the document.

A large amount of light is required for precisely reading image information on a transparent document, in particular, a negative film. More specifically, it is necessary to accurately detect a density change in the information concerning a bright portion of a subject which is recorded in a dark portion of a negative film. To meet this requirement, a bright light source and a translucent plate having high transmittance are needed.

As noted above, there is generated a deviation in the positional relationship between the scanning optical system 102 (the lamp unit 103) and the transparent-document-reading light source $L_2$ as the sub-scanning operation proceeds (see FIG. 6A). To avoid a change in the light quantity due to this deviation, a region in which the light quantity is uniform (hereinafter referred to as "a uniform-light-quantity region") on the document surface should be as large as possible, and accordingly, the diffusion coefficient of the translucent plate 201 should be as high as possible.

However, the transmittance and the diffusion coefficient of a translucent plate have a trade-off relationship. Increased transmittance decreases the uniform-light-quantity region. Thus, an appropriate trade-off between the two factors should be determined. There are also other factors which decrease the uniform-light-quantity region, such as skewing of the light source $L_2$ itself, and a difference in tilting in the main scanning direction between the optical system 102 of the apparatus unit 100 and the transparent-document reading light source $L_2$ (see FIG. 6A).

SUMMARY OF THE INVENTION

Accordingly, in view of the above background, it is an object of the present invention to provide an image reading apparatus which is capable of sharply reading a transparent document.

It is another object of the present invention to provide an image reading apparatus which is able to utilize a light source having only low luminosity.

It is still another object of the present invention to provide an image reading apparatus that is able to substantially maintain light quantity at reading lines in the area from the upper edge to the lower edge in the sub-scanning direction.

It is a further object of the present invention to provide an image reading apparatus comprising an original-document-mounting table, a light source unit for illuminating an original document placed on the original-document-mounting table, the light source unit moving along the original-document-mounting table, a scanning unit for scanning the original document illuminated by the light source unit, the scanning unit moving in conjunction with the movement of the light source unit during document reading, correction means for correcting a relative position between the light source unit and the scanning unit located when document reading is started, the correction means correcting the relative position according to an output obtained when the light emitted from the light source unit is scanned by the scanning unit.

Further objects, features and advantages of the present invention will become apparent from the following description of the preferred embodiments with reference to the attached drawings.

BRIEF DESCRIPTION OF THE DRAWINGS

FIG. 3 illustrates an alignment method of a second embodiment used in an image reading apparatus according to the present invention;

FIG. 4 illustrates an alignment method of a third embodiment used in an image reading apparatus according to the present invention;

FIG. 5 illustrates an alignment method of a fourth embodiment used in an image reading apparatus according to the present invention;

FIG. 9 illustrates a deviation of the reading position caused by a deviation of a mirror angle.

DESCRIPTION OF THE PREFERRED EMBODIMENTS

[First Embodiment]

An explanation will now be given with reference to FIGS. 6A and 6B, 7 and 8 of the construction of a main unit (apparatus unit) 100 of an image reading apparatus and a reading light source unit 200 according to the present invention. The mechanical construction of the image reading apparatus to which the present invention is applied is similar to the construction of a known reading apparatus.

Figure 6A:
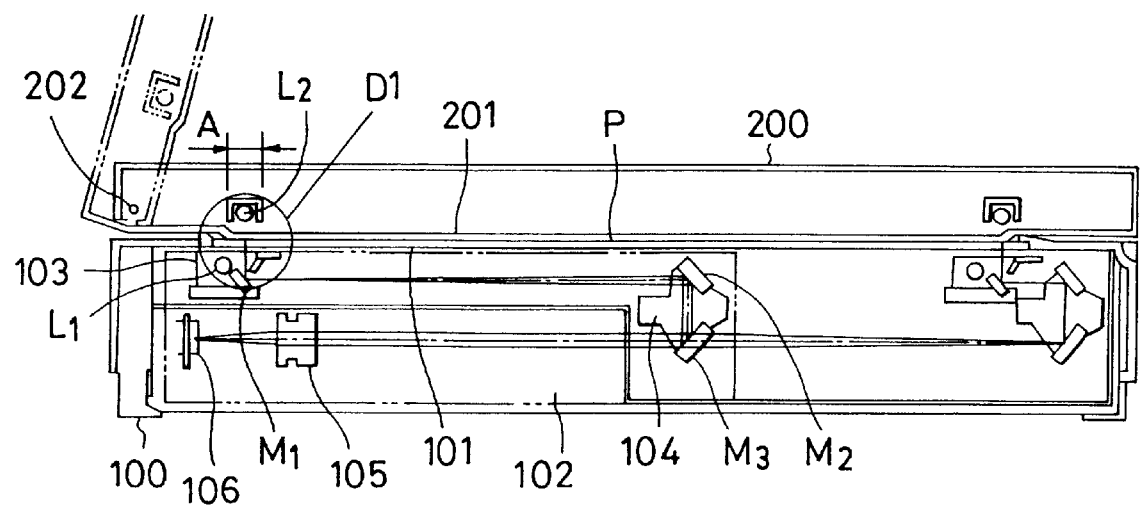
FIGS. 6A and 6B illustrates an image reading apparatus.

FIG. 6A is a schematic diagram illustrating a conventional image reading apparatus. In the drawing, there is shown an image sensor 106 serving as photoelectric conversion means, such as a charge coupled device (CCD) for converting information concerning a scanned image into an electric signal, the sensor 106 being disposed within the main unit 100 of an image reading apparatus.

An original-document-mounting glass 101, used as a transparent original-document-mounting table, is disposed on the top surface of the apparatus unit 100. A document P placed on the surface of the document-mounting glass 101 is scanned by a scanning optical system 102 serving as scanning means so as to expose image information onto the image sensor 106.

Disposed within the image sensor 106 are three rows of sensors provided with filters of three colors, such as red (R), green (G) and blue (B), respectively, thereby performing color separation when reading a document image. The image scanning means 102 is constructed of a lamp unit 103 and a mirror unit 104, both of which are moved parallel to the glass 101 to perform scanning, and a stationary lens 105 fixed in the apparatus unit 100.

The lamp unit 103 is formed of a white-color light source $L_1$ for illuminating the document P, and a first mirror $M_1$ for reflecting the reflected light from the image formed on the document P toward the mirror unit 104. The mirror unit 104 is comprised of second and third mirrors $M_2$ and $M_3$, respectively, for returning the image light reflected by the first mirror $M_1$ toward the image sensor 106.

The lamp unit 103 moves at a velocity twice as fast as the mirror unit 104 to perform scanning in order to ensure a constant optical path in the overall image reading region. Accordingly, the scanning optical system 102 of the above type is referred to as a "2:1 scanning optical system". These units 103 and 104 perform scanning (sub-scanning) using a driving source (not shown), such as a pulse motor, as a power source, in synchronization with the reading cycle of the image sensor 106.

In FIG. 6A, there is also shown a transparent-document-reading light source unit 200 serving as illumination means for reading transparent documents. Disposed within the light source unit 200 are a light source $L_2$ located parallel to the light source $L_1$ within the apparatus unit 100, and a light-diffusing translucent plate 201 placed to opposedly face the document-mounting table 101. The transparent-document-reading light source unit 200 is attached to the rear end of the image reading apparatus and pivots about a hinge 202.

Figure 6B:
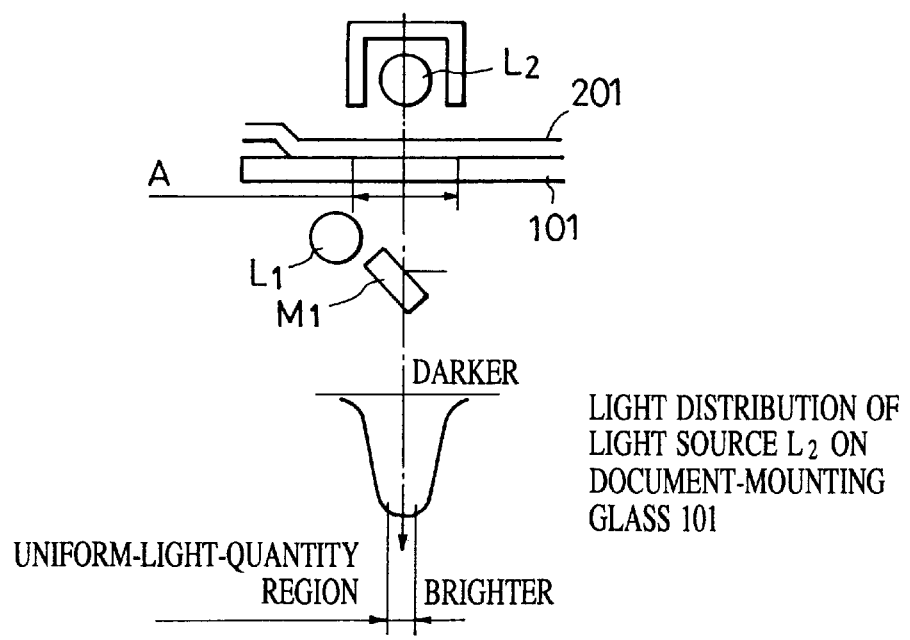

For reading a transparent document, the light source $L_2$ is driven by a driving source (not shown) to scan the area covered by the document-mounting glass 101 in a direction parallel to the translucent plate 201 while synchronizing with the image scanning means 102 of the apparatus unit 100. During this scanning operation, the light source $L_1$ within the apparatus unit 100 is switched off. Light emitted from the light source $L_2$ is diffused in the translucent plate 201, bringing about a light distribution illustrated in FIG. 6B (enlarged from the region D1 shown in FIG. 6A) on the document surface. From the light distributed as indicated in FIG. 6B, the light located on the light path in an area from the reading position of the image reading apparatus unit 100 to the image sensor 106 penetrates the document placed at a position P shown in FIG. 6A and is directed to the image sensor 106.

For reading a transparent document, the document is not allowed to be placed in the area A (hereinafter referred to as "the document-placing prohibited area A") at the upper edge of the document-mounting table 101. Prior to document reading, in this area A the image sensor 106 reads the light quantity and the light distribution directly obtained from the transparent-document light source $L_2$ and uses these as data concerning, for example, shading correction.

Figure 7:
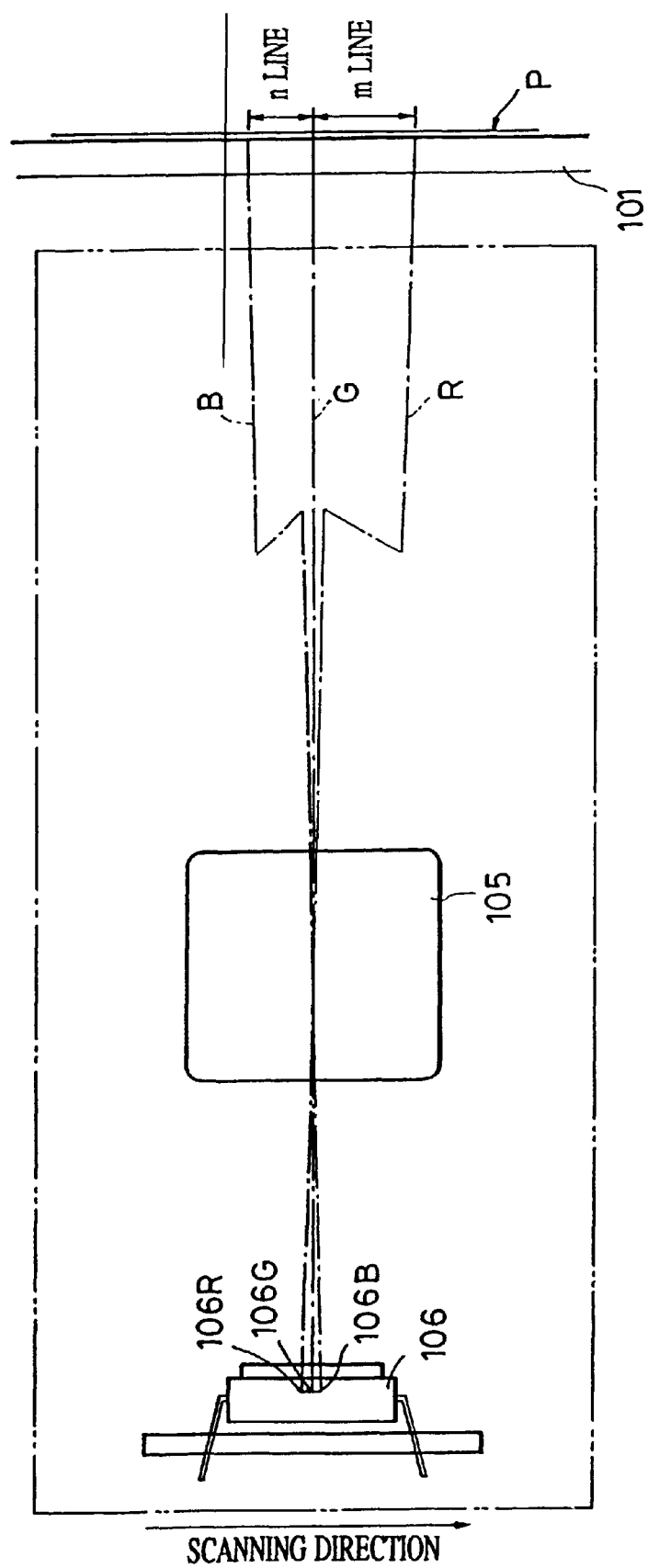
FIG. 7 illustrates photodetectors of an image sensor.

FIG. 7 schematically illustrates a document image being formed on photodetectors of the image sensor 106. Photodetectors of three colors 106R, 106G and 106B are spaced apart from each other because a portion for accumulating charges photoelectrically converted by the photodetectors and a portion for transferring signals to an output stage are adjacently disposed around the photodetectors of the image sensor 106.

Since the image sensor 106 is shifted relative to the document to allow the photodetectors 106R, 106G and 106B to read the same position of the document, the intervals between the photodetectors 106R, 106G and 106B are determined to be integral multiples of the width of the photodetectors 106R, 106G and 106B. If there is an m-line interval between the photodetectors 106R and 106G and an n-line interval between the photodetectors 106G and 106B, an image signal G representing one line of a document image is read m lines later relative to an image signal R, and an image signal B is read (m+n) lines later relative to the image signal R.

Figure 8:
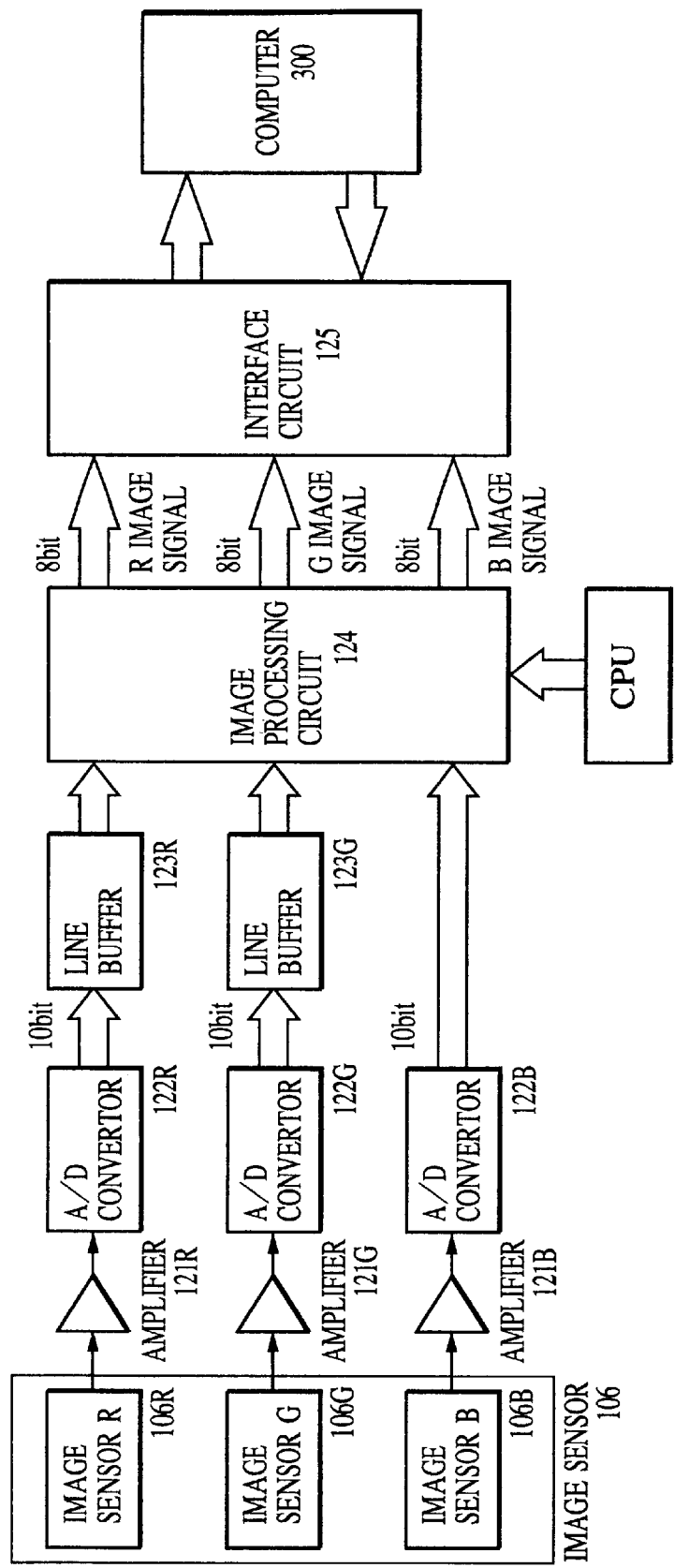
FIG. 8 is a block diagram illustrating the processing of read image data.

FIG. 8 is a block diagram illustrating the processing of image data read by the color image sensor 106. After the image data items of the respective colors read by the image sensor 106 are sent to and amplified in amplifiers 121R, 121G and 121B, respectively, they are converted into digital image signals by analog-to-digital (A/D) converters 122R, 122G and 122B, respectively. The A/D converters 122R, 122G and 122B each divide the dynamic range (a difference in the reading output between a pure white region and a pure black region of the document) of the image sensor 106 according to a bit number, thereby assigning levels of gradation according to the brightness of the document image.

For example, 8-bit-resolution A/D converters are capable of distinguishing white to black gradations into 256 levels, while 10-bit-resolution A/D converters are able to differentiate the same gradation into 1024 levels. Thus, an image reading apparatus using A/D converters with RGB colors each having 8 bits can identify 24 bits, i.e., approximately 16.7 million colors, while an image reading apparatus using A/D converters with RGB colors each having 10 bits can distinguish 30 bits, i.e., about 1074 million colors.

The respective colors of photodetectors 106R, 106G and 106B of the image sensor 106 are spaced apart from each other as noted above. Accordingly, in order to perform phase matching of the respective image signals before the signals are input into an image processing circuit 124, a (m+n)-line buffer memory 123R and an n-line buffer memory 123G are respectively provided at the rear stage of the A/D converters 122R and 122G, and the image signals R and G can be output simultaneously with the last-read B signal. In the image processing circuit 124, the image signals are subjected to processing, such as binary processing, for color correction. The resulting image signals are output to a machine 300, such as a personal computer, via an interface circuit 125.

There are several types of output states of the image signals from the image reading apparatus, and a suitable type can be selected according to the use of the read image. For example, when text is read by an optical character reader (OCR), or when a monochrome diagram is read, a monochrome binary image is appropriate. More specifically, a G signal, for example, among the RGB image signals is used and binarized with a threshold in the image processing circuit 124, and the binarized image data is selected. Further, when a photographic image is read and output to a monochrome printer, image data binarized using the G signal according to half tone processing, such as the dither method or the error diffusion method, is used. Multilevel (e.g. 24 bits, etc.) image data is suitably used for processing color images.

In most cases, the resolution of the A/D converters used in the image reading apparatus is comparable to the image processing performance of a computer to be connected to the apparatus (A/D converters with RGB colors each having 8 bits are employed in an image reading apparatus for use in a computer which is capable of processing 24-bit images). For achieving higher-precision gradation steps, however, some image reading apparatuses use A/D converters with a resolution higher than the image processing performance of the corresponding computer. In this type of image reading apparatus using, for example, A/D converters with RGB colors each having 10 bits, the respective RGB signals each having 10-bit gradation levels are converted into 8-bit signals in the above-described image processing circuit 124, and the 8-bit signals are output.

Figure 1:
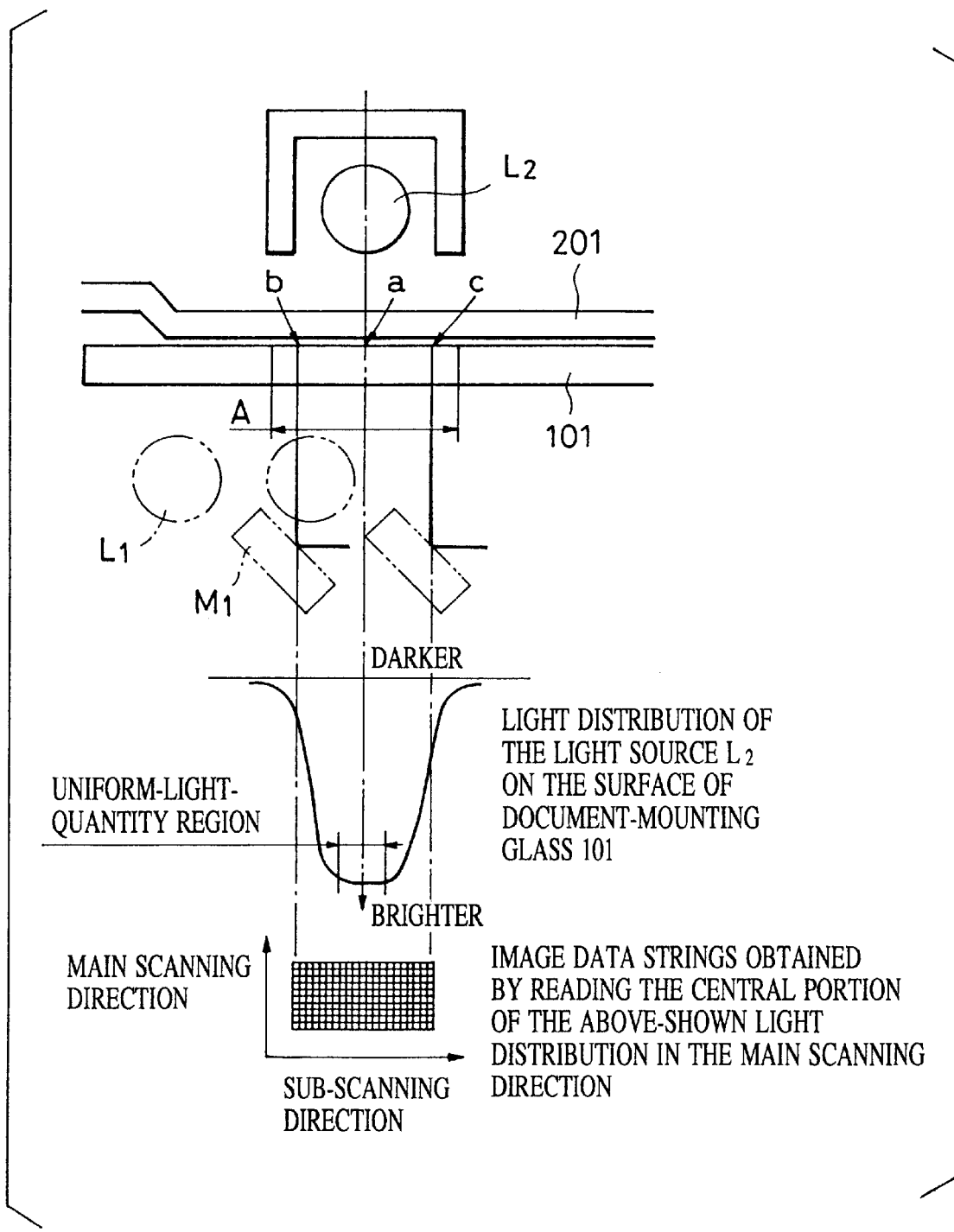
FIG. 1 illustrates an alignment method of a first embodiment used in an image reading apparatus according to the present invention.
Figure 2:
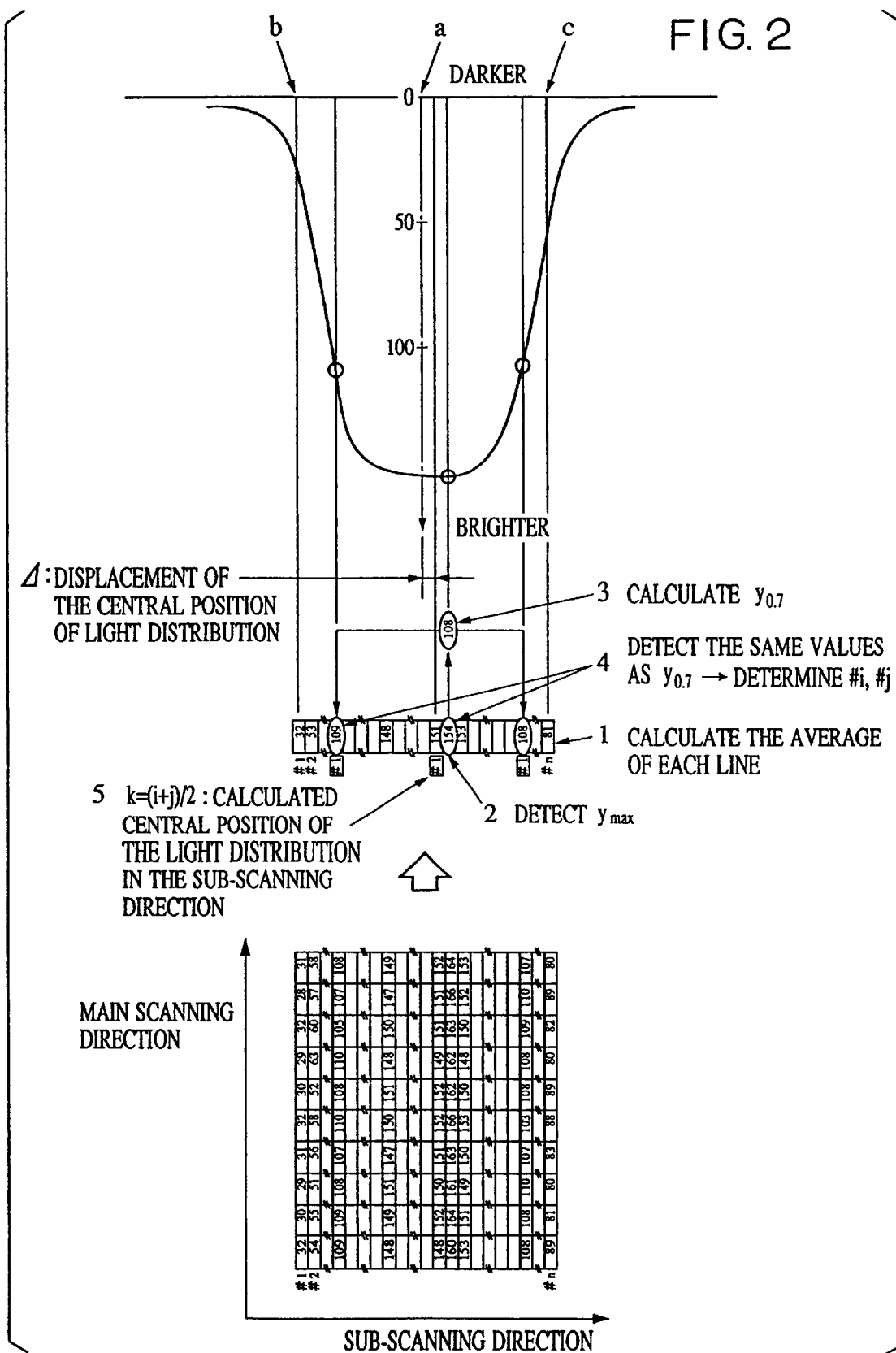
FIG. 2 illustrates the alignment method of the first embodiment used in an image reading apparatus according to the present invention.

A description will now be given of positional-correction control means, which is a feature of the present invention, while referring to FIGS. 1 and 2. This control means may be operated without requiring a modification to hardware (i.e., the mechanical portion) of the aforedescribed image reading apparatus. Thus, an explanation will be hereinafter given assuming that the above control means be constructed based on software or by adding an electronic component to a controller (unillustrated) of the apparatus.

In response to a transparent-document reading instruction provided from a computer connected to the image reading apparatus, the light source $L_2$ advances from a home position (on the left side of FIG. 1) to a predetermined position a located within the area A at the sub-scanning upper edge of the document-mounting glass 101, and comes to a stop. A photo-interrupter (not shown), for example, is used to control the stop position of the light source $L_2$. After the light source $L_2$ has started to advance, a predetermined distance travelled by the light source $L_2$ upon the changing of the output of the photo-interrupter is determined to be the position a. At this position a, the light source $L_2$ is lit.

Subsequently, the image scanning means 102 of the main unit 100 of the image reading apparatus starts scanning. In a manner similar to positioning of the light source $L_2$, the location of the scanning means 102 is controlled by a photo-interrupter (not shown). It should be noted that the light source $L_1$ is switched off. When the scanning means 102 reaches the position b in the vicinity of the stop position a of the light source $L_2$, the image reading apparatus starts reading image data and stores in a buffer memory the image data with a fixed width (for example, 10 pixels) at the central portion in the main scanning direction ranging from position b to position c beyond position a. This image data is equivalent to the light-quantity distribution in the sub-scanning direction of the light source $L_2$.

Thereafter, calculation means (not shown) within the apparatus unit 100 performs the following calculations to obtain the light distribution of the light source $L_2$ in the sub-scanning direction and its central position:

1. calculating the average of the extracted data in each sub-scanning line;
2. detecting the maximum $y_{max}$ among the values in the data string obtained by the above calculation;
3. calculating the value $y_{0.7}$ obtained by multiplying the maximum $y_{max}$ by a predetermined width (for example, 0.7);
4. searching the data string created in step 3 for the same value as or the closest value to $y_{0.7}$ in order to detect two values in the data string from the light-quantity increasing and decreasing areas, respectively, and determining the order of the detected values in the data string to be i, j; and
5. calculating the equation: $k=(i+j)/2$ to determine the central position of the light distribution of the light source $L_2$ in the sub-scanning direction.

A difference expressed by Δ=k(the number of lines between the position b and the position a) indicates a displacement of the central position of the actual light distribution deviating from a correct central position obtained by originally aligning the image scanning means 102 and the light source $L_2$ under the control of the respective photo-interrupters. Accordingly, the positional relationship between the image scanning means 102 and the light source $L_2$ is corrected by an amount equal to the above displacement Δ, so that the reading position of the image scanning means 102 at the upper edge in the sub-scanning direction can match the central position of the light distribution of the light source $L_2$.

Upon completion of the alignment operation according to the aforedescribed sequence, a transparent document placed farther toward the lower edge in the sub-scanning direction than the document-placing prohibited area A is read.

If "the uniform-light-quantity region" of the light source $L_2$ is large enough to offset a positional displacement in the overall scanning region between the image scanning means 102 and the light source $L_2$, a uniform light quantity in the entire scanning region can be ensured. Thus, the transmittance of the translucent plate (diffusion plate) 201 can be increased within a condition which satisfies the above requirement, thereby increasing the light quantity and further improving the quality of the read image.

The aforedescribed positional correction may be performed at various times, such as immediately after the transparent-document reading light source unit 200 is attached to the apparatus unit 100, when power is supplied, or every time a reading operation is performed.

This embodiment has been explained in which a 2:1 scanning optical unit is used as an optical system for the apparatus unit 100. The optical system is not, however, restricted to such a scanning optical unit, and an integral-type optical system having a light source, a mirror, a lens, and a CCD, all of which are built into one unit, may be applicable.

Further, in this embodiment, the image scanning means 102 and the transparent-document light source unit 200 respectively have the individual scanning driving sources. This invention is, however, effective even though both elements share a common driving source because each scanning system possesses error in its moving distance, as noted above.

[Second Embodiment]

The light distribution of the transparent-document reading light source $L_2$ may sometimes be inclined relative to the main scanning line of the scanning optical system 102 due to skewing of the light distribution of the reading light source $L_2$ itself or a positional deviation or inclination of the light source $L_2$ relative to the scanning optical system 102 caused by lack of precision in apparatus parts or assembly. In this embodiment, an improvement in alignment precision will be targeted to solve the above problem. A detailed explanation of this embodiment will now be given with reference to FIG. 3.

A sequence from the start of the movement of the light source $L_2$ to the start of scanning by the optical system 102 is similar to the sequence employed in the first embodiment. When the scanning optical system 102 reaches the position b near the stop position a of the light source $L_2$, the image reading apparatus commences to read image data and stores in a buffer memory the image data of the overall area or both edges of the area from position b to position c beyond position a in the main scanning direction.

Subsequently, the following calculations are performed within the main unit 100 of the image reading apparatus to determine the light distribution of the light source $L_2$ in the sub-scanning direction and its central position:

1. extracting data with a fixed width of the left edge in the main scanning direction from the above-described data;
2. calculating the average of the extracted data in each sub-scanning line;
3. detecting the maximum $y_{LEFTmax}$ from the data string obtained by the above calculation;
4. calculating the value $y_{LEFT0.7}$ obtained by multiplying the maximum $y_{LEFTmax}$ by a fixed value (for example, 0.7);
5. searching the data string created in step 3 for the same value as or the closest value to the value $y_{LEFT0.7}$ in order to determine two values in the data string from the light-quantity increasing and decreasing areas, respectively, and determining the order of the detected values in the data string to be $i_{LEFT}$, $j_{LEFT}$;
6. calculating the equation: $k_{LEFT}=(i_{LEFT}+j_{LEFT})/2$ to determine the central position of the left-edge light distribution in the sub-scanning direction;
7. similarly calculating the equation:
   $k_{RIGHT}=(i_{RIGHT}+j_{RIGHT})/2$ from the fixed-width data at the right edge in the main scanning direction in order to determine the central position of the right-edge light distribution in the sub-scanning direction; and
8. calculating the equation: $k_{CENTER}=(k_{LEFT}+k_{RIGHT})/2$ to determine the central position of the light source $L_2$.

A displacement $\Delta=k_{CENTER}$ (the number of lines between the position b and the position a) indicates a displacement of the actual central position of the light distribution deviating from the correct central position originally obtained by aligning the optical system 102 of the apparatus unit 100 and the light source $L_2$ under the control of the respective photo-interrupters (not shown). Accordingly, the positional relationship between the optical system 102 and the light source $L_2$ is corrected by an amount equal to the above displacement $\Delta$, so that the reading position of the optical system 102 and the central position of the light distribution of the light source $L_2$ can be aligned at the upper edge in the sub-scanning direction.

This embodiment makes it possible to absorb mechanical errors generated in a combination of the apparatus unit and the light source unit, thereby achieving higher alignment precision over the first embodiment.

[Third Embodiment]

In the aforedescribed first and second embodiments, alignment of the optical system 102 of the apparatus unit 100 and the transparent-document reading light source $L_2$ are performed at one edge of the document-mounting glass 101. This alignment is performed assuming that there is generated a displacement between the scanning optical system 102 and the light source $L_2$ due to errors in their moving accuracy as a scanning operation proceeds. To accommodate this displacement, the width of "the uniform-light-quantity region" should be sufficiently large relative to the moving-accuracy error.

In order to meet this requirement, in this embodiment the above-described moving-accuracy error is detected in advance, and the movements of the optical system 102 and the light source $L_2$ are controlled to offset the above error by the time a document image is read. As a result, the light quantity can be further stabilized, and the width of "the uniform-light-quantity region" can be decreased to increase the transmittance. This embodiment will now be explained in greater detail with reference to FIG. 4.

An alignment operation of this embodiment is preferably performed in the state in which there is no document placed on the document-mounting glass 101. This entails the following operation approach: a calibration mode, as well as a normal reading operation mode, is provided, and when an alignment operation is performed, the calibration mode is instructed through a computer without a document placed on the glass 101.

The scanning optical system 102 of the apparatus unit 100 and the transparent-document reading light source $L_2$ are located at the upper edge a of the document-mounting glass 101 in the sub-scanning direction, and the number of lines $k_{TOP}$ from the position b to the central position of the light distribution of the light source $L_2$ is first determined based on the second embodiment.

Then, the scanning optical system 102 and the light source $L_2$ are shifted toward the lower edge of the document-mounting glass 101 under the control of the photo-interrupters (not shown) in a manner similar to the above embodiments so as to determine the central position of the light distribution of the light source $L_2$ in the lower-edge position.

More specifically, the light source $L_2$ is shifted to the lower edge a' of the document-mounting glass 101 and comes to a halt, and the movement of the scanning optical system 102 is then started. When the scanning optical system 102 reaches the position b' in the vicinity of the stop position a' of the light source $L_2$, the image reading apparatus commences to read image data and stores in a buffer memory (not shown) the image data of the overall area in the main scanning direction ranging from position b' to position c' beyond position a'. It should be noted that the distance between position a' and position b' and the distance between position b' and position c' are the same as the distance between position a and position b and the distance between position b and position c, respectively. The number of lines $k_{END}$ from the position b to the central position of the light distribution of the light source $L_2$ is determined by using the above image data based on the calculation made in the second embodiment. A calibration difference expressed by $\Delta_{END/TOP}=k_{END}-k_{TOP}$ represents a difference in the moving distance from the upper edge to the lower edge in the sub-scanning direction between the scanning optical system 102 and the light source $L_2$. Calibration is thus completed.

Document reading is then started according to the upper-edge displacement $\Delta$ in the sub-scanning direction determined in the second embodiment and the displacement $\Delta_{END/TOP}$ found in this embodiment. The positional relationship between the scanning optical system 102 and the light source $L_2$ is first corrected based on the displacement $\Delta$ at the upper edge in the sub-scanning direction in a manner similar to the operation employed in the foregoing embodiments. Document reading is restarted, and at the same time, the distance to be shifted by the light source $L_2$ is calibrated based on the displacement $\Delta_{END/TOP}$ according to a sampling method. This will now be explained in greater detail by using a 300-dpi-resolution image reading apparatus by way of example which is capable of reading an A4-size (210 mm×297 mm) document.

The number of lines in the sub-scanning direction of this apparatus is 3508 ((297/25.4)×300=3507.9). It will now be assumed that a difference $\Delta_{END/TOP}$ in the moving distance from the upper edge to the lower edge in the sub-scanning direction between the scanning optical system 102 and the light source $L_2$ is 1 mm. This difference is equivalent to (1/25.4)×300=11.8 lines in terms of the number of sub-scanning lines. If 11.8 lines are adjusted by the time scanning is completed for 3508 lines, the reading position of the scanning optical system 102 should match the central position of the light distribution of the light source $L_2$ even when the optical system 102 reaches the low edge in the sub-scanning direction. Accordingly, one line is adjusted about every 297 lines (3508/11.8=297.3).

More specifically, while the scanning optical system 102 scans 297 lines, the light source $L_2$ is shifted in the following manner. If the distance traveled by the light source $L_2$ is larger than that by the optical system 102, the light source $L_2$ is shifted 296 lines. Conversely, if the distance shifted by the light source $L_2$ is smaller than that by the optical system 102, the light source $L_2$ is moved 298 lines. This means that the scanning optical system 102 and the light source $L_2$ are relatively displaced from each other by one line every 297 lines, which is equal to 25.4/300=0.0847 mm in terms of dimension. However, the light quantity reaching the image sensor is unchanged by this displacement, thereby preserving image quality.

The displacement $\Delta_{END/TOP}$ is calibrated by controlling the distance to be shifted by the light source $L_2$, as discussed above. This is because, if adjustment is performed in the apparatus unit 100, image missing or overlapping takes place in the adjusted lines. Without this problem, calibration may be safely performed in the apparatus unit 100. In short, it is essential only that the relative moving distance between the light source $L_2$ and the scanning optical system 102 be changed.

[Fourth Embodiment]

In this embodiment, as well as in the third embodiment, error in moving precision is detected in advance and is offset in the overall scanning area by the time document reading is started. This embodiment will now be explained in greater detail while referring to FIG. 5.

Error in moving accuracy is detected, i.e., a difference $\Delta_{END/TOP}$ in the distance from the upper edge to the lower edge in the sub-scanning direction between the scanning optical system 102 and the light source $L_2$ is determined, in a manner similar to the third embodiment.

However, the fourth embodiment differs from the third embodiment in the following steps. Upon starting document reading, the positional relationship between the scanning optical system 102 and the light source $L_2$ is corrected based on the displacement $\Delta$ determined in the second embodiment and is further adjusted based on a difference $\Delta_{END/TOP}/2$. Accordingly, there is a displacement $\Delta_{END/TOP}/2$ between the scanning optical system 102 and the light source $L_2$ at the upper edge in the sub-scanning direction. However, as scanning proceeds, the displacement $\Delta_{END/TOP}/2$ is gradually reduced and becomes zero at the center, and starts to increase in the reverse direction as scanning is moved toward the lower edge and reaches $\Delta_{END/TOP}/2$ at the lower edge.

The maximum displacement between the scanning optical system 102 and the central position of the light distribution of the light source $L_2$ is reduced to one half of the displacement in the second embodiment, thereby further stabilizing light quantity.

As is seen from the foregoing description, the image reading apparatus of the present invention offers the following advantages.

The central position of the illumination means 200 is set based on the light distribution of the illumination means 200 in the sub-scanning direction, and the relationship between the central position of the illumination means 200 and the reading position of the scanning means 102 in the sub-scanning direction is adjusted, thereby maintaining the light quantity.

The illumination means 200 and the scanning means 102 are aligned with high precision, which makes it possible to decrease the diffusion coefficient of a translucent plate 201. Accordingly, the transmittance can be raised to increase the light quantity applied to a transparent document P, thereby widening the dynamic range and achieving high quality images.

Since alignment between the illumination means 200 and the scanning means 102 can be implemented by application of this invention, it is not necessary to maintain high precision in apparatus parts and assembly, thereby reducing the cost.

The present invention can be applied by a conventionally-available electronic component built into or added to the controller of the image reading apparatus or by installing a software program. Application cost is thus minimal.

Further, the light distribution of the illumination means 200 in the sub-scanning direction is detected in at least two positions spaced from each other in the main scanning direction. It is thus possible to adjust the inclined positional relationship between the illumination means 200 and the scanning means 102.

Moreover, the light distribution of the illumination means 200 in the sub-scanning direction is detected in at least two positions spaced from each other in the sub-scanning direction, thereby correcting a displacement between the illumination means 200 and the scanning means 102 when these means are shifted in the sub-scanning direction.

The light distribution is detected in the document-placing prohibited area A, thereby speedily detecting the light distribution of the illumination means 200 in the sub-scanning direction regardless of the presence or absence of a document.

Further, in this image reading apparatus, the positional-correcting operation can be performed prior to image-information reading without delaying the following reading operation.

Both types of illumination means, i.e., transmit-type illumination means and reflection-type illumination means, can be provided to read either of or both transparent documents and reflection documents. Additionally, according to the present invention, it is possible to absorb a relative positional displacement between a scanning unit and a light source unit caused by the movement of the scanning unit or the light source unit. This effect can be sufficiently exerted when the present invention is applied to a 2:1 scanning optical unit or a scanning optical unit in which a CCD, a lens, and a mirror are integrally moved.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus comprising:
   an original-document-mounting table;
   a light source unit for illuminating an original document placed on said original-document-mounting table, said light source unit moving along said original-document-mounting table;
   a scanning unit for scanning the original document illuminated by said light source unit, said scanning unit moving in conjunction with the movement of said light source unit during document reading;
   a line sensor for receiving light obtained through said scanning unit, said line sensor having a plurality of light receiving elements arranged in a line perpendicular to a direction relative to a moving direction of said scanning unit; and
   correction means for correcting a relative position between said light source unit and said scanning unit, said correction means correcting the relative position according to an output exclusively from right and left edges of said plurality of light receiving elements in the perpendicular direction when said scanning unit scans a plurality of lines with said light source.

2. An image reading apparatus according to claim 1, wherein said correction means corrects the relative position according to a distribution of the quantity of light emitted from said light source unit.

3. An image reading apparatus according to claim 2, wherein said scanning unit is shifted to detect the light-quantity distribution in a state in which said light source unit comes to a halt in a predetermined position.

4. An image reading apparatus according to claim 1, wherein said correction means corrects the relative position every time an original reading operation is performed.

5. An image reading apparatus according to claim 1, wherein said correction means corrects the relative position when power is supplied to the main unit of said image reading apparatus.

6. An image reading apparatus according to claim 1, further comprising a transparent or translucent pressure plate for bringing the original document into contact with said original-document-mounting table, said light source unit being loaded within said pressure plate.

7. An image reading apparatus according to claim 1, wherein a motor for driving said light source unit is different from a motor for driving said scanning unit.

8. An image reading apparatus according to claim 1, wherein said scanning unit comprises a photoelectric conversion device fixed at a predetermined position within the main unit of said image reading apparatus, and a mirror for directing an original-document image to said photoelectric conversion device while moving in conjunction with the movement of said light source unit.

9. An image reading apparatus according to claim 1, wherein said scanning unit comprises a photoelectric conversion device which moves in conjunction with the movement of said light source unit.

* * * * *